US 6,552,548 B1

(12) United States Patent
Lewis et al.

(10) Patent No.: US 6,552,548 B1
(45) Date of Patent: Apr. 22, 2003

(54) DETECTING UNDERGROUND OBJECTS

(75) Inventors: Andrew Biggerstaff Lewis, Bristol (GB); Richard William Fling, Bristol (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 09/332,783

(22) Filed: Jun. 14, 1999

(30) Foreign Application Priority Data

Jun. 15, 1998 (GB) ............................................. 9812884

(51) Int. Cl.[7] .......................... G01V 3/08; G01V 3/165; G01V 15/00
(52) U.S. Cl. ........................ 324/326; 175/45; 324/337
(58) Field of Search ........................... 324/326, 207.26, 324/244, 226, 67, 327, 328, 329; 175/45

(56) References Cited

U.S. PATENT DOCUMENTS

| 3,907,045 A | | 9/1975 | Dahl et al. ..................... 175/45 |
| 4,806,869 A | * | 2/1989 | Chau et al. .................. 324/326 |
| 5,093,622 A | * | 3/1992 | Balkman .................... 324/326 |
| 5,320,180 A | | 6/1994 | Ruley et al. .................. 175/26 |
| 5,513,710 A | | 5/1996 | Kuckes ........................ 175/45 |
| 5,698,981 A | * | 12/1997 | Mercer ........................ 324/329 |
| 5,711,381 A | * | 1/1998 | Archambeault et al. ...... 175/45 |
| 5,757,190 A | | 5/1998 | Mercer ........................ 324/326 |
| 5,764,062 A | * | 6/1998 | Mercer ........................ 324/329 |
| 5,920,194 A | * | 7/1999 | Lewis et al. .................. 324/326 |

FOREIGN PATENT DOCUMENTS

| EP | 0 246 886 A1 | 11/1987 |
| EP | 0 262 882 A3 | 4/1988 |
| WO | WO95/30913 | 11/1995 |
| WO | WO96/29615 | 9/1996 |
| WO | WO 96/29615 | * 9/1996 |

* cited by examiner

Primary Examiner—Edward Lefkowitz
Assistant Examiner—Reena Aurora
(74) Attorney, Agent, or Firm—Baker + Hostetler LLP

(57) ABSTRACT

A monitoring device defines a boundary for movement of an underground object such as a booring tool. The underground object generates a magnetic field which is detected by the monitoring device. The monitoring device then determines the position of the underground object relative to itself, and hence to the boundary. The movement of the underground object can then be controlled so that it does not cross the boundary. The monitoring device may therefore define a protection zone so that a buried object within that protection zone will not be contacted by the moveable underground object.

10 Claims, 7 Drawing Sheets

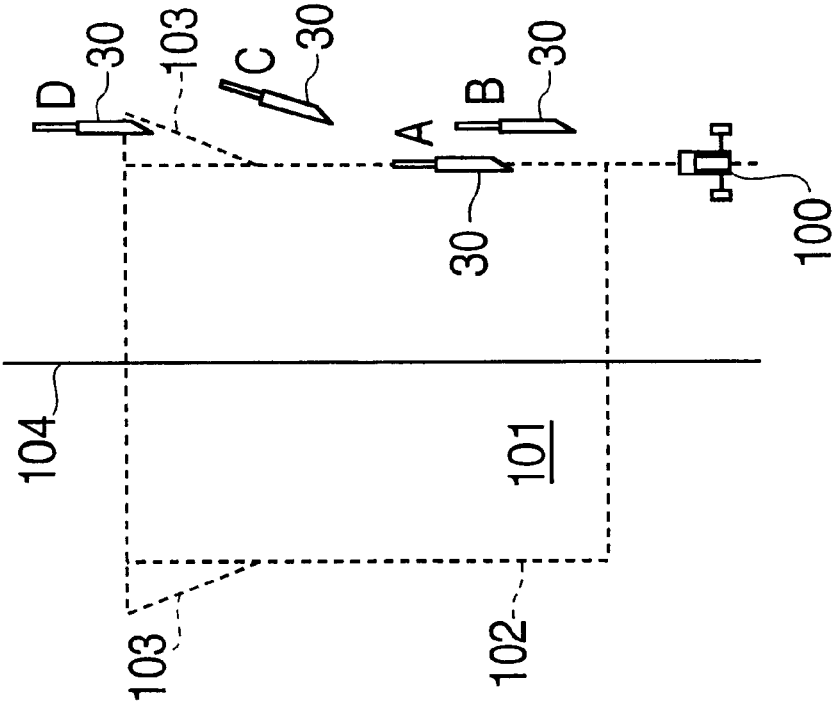
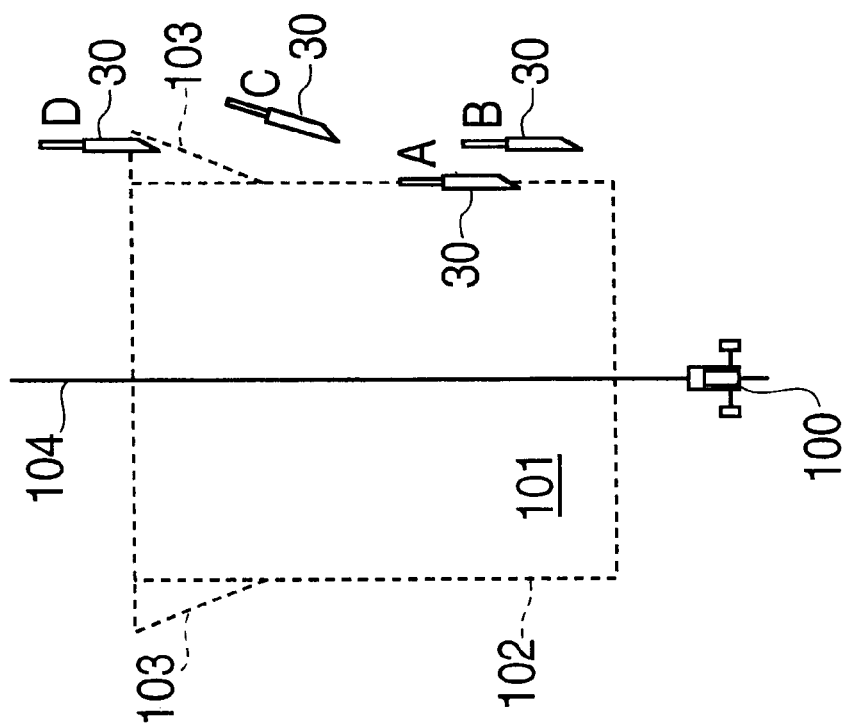

DETECTING UNDERGROUND OBJECTS

BACKGROUND OF THE INVENTION

1. Field of the Invention

The present invention relates to the detection of objects moving underground. It is particularly, but not exclusively, concerned with the case where the moving underground object is a boring tool.

2. Summary of the Prior Art

It is already known, from eg WO95/30913 for antennas in a boring tool to be used to detect the electromagnetic field generated from a buried current-carrying conductor. The use of multiple antennas enables the relative positions of the boring tool and conductor to be determined to prevent the boring tool contacting the conductor, which may damage the conductor. WO95/30913 also discloses that it is possible to control the drilling force of the boring tool in dependence on the separation of the boring tool and the conductor.

The arrangement described in WO95/30913 depends on the conductor carrying a current of sufficient magnitude and frequency that the magnetic field generated may be detected at a sufficiently large distance from the conductor. The technique is therefore not suitable for preventing contact between a boring tool and an object which does not carry current.

In WO 96/29615 corresponding to U.S. Ser. No. 08/894664, the disclosure of which is incorporated herein by reference, an arrangement was disclosed in which an underground boring tool had a solenoid on or in it, which solenoid generated a magnetic field which could then be detected remotely by suitable antennas. In such an arrangement, by analysing the signals at the antennas, the relative position of the antennas and the boring tool could be determined.

SUMMARY OF THE INVENTION

The present invention, at its most general, proposes that a monitoring device is provided which is able to detect a moving underground object, and the monitoring device defines at least one boundary which the moving underground object should not cross. The monitoring device may then be connected to the drive to the moving underground object to inhibit or alter movement of the underground object when that boundary is reached, or an alarm can be generated when the underground object reaches the boundary.

This enables the monitoring device to define a protection zone into which the underground object cannot. enter. That protection zone is defined by the monitoring device, and therefore the monitoring device needs to be positioned so that a buried object which the moving underground object should not contact is within the protection zone. However, assuming a suitable size of protection zone, exact positioning of the monitoring device relative to the buried object is not needed. Moreover, any type of buried object can be protected, not merely current carrying objects.

As mentioned above, the monitoring device must define at least a boundary, and preferably a protection zone, which the moving underground object should not cross. The monitoring device therefore needs to be able to define the boundary (s), and also needs to determine the position of the moving underground device in relation to the boundary(s). This can be done, for example, by determining the position of the moving underground object relative to the monitoring device, and comparing that position with the position(s) of the boundary(s).

Many different techniques can then be used to determine the position of the moving underground object. For example, if the monitoring device contains two antennas, the techniques disclosed in WO96/29615 can then be used. Since the techniques disclosed in WO96/29615 are based on the assumption that the measurements are carried out in a plane containing the axis of a solenoid in the moving underground object, those techniques are suitable for use when the boundary is transverse to that plane. In such circumstances, even if the monitoring device is not on the axis, the calculations made (which assume it is) will nevertheless determine the relative position of the underground moving object relative to the boundary.

The techniques disclosed in WO96/29615 depend on comparison of measured values of the axial radial component of the magnetic field from the solenoid with stored information relating to the relationship between the axial radial components. By comparison of the measured values with those stored, the relative position of the solenoid (and hence the moving underground object) and the monitoring device can be determined.

However, other techniques for determining the position of the solenoid in the underground moving object may be used. For example, and as discussed in GB 2330204 it is possible to detect the vertical and horizontal fields from a solenoid and to use those values to predict the ratio of the vertical and horizontal fields at a position vertically above (or below) the solenoid. In GB 2330304, corresponding to U.S. Ser. No. 09/168414, the disclosure of which is incorporated herein by reference, it was then assumed that the detector was moved until those two values coincide. Then, the detector was vertically above the underground moving object. However, in the present invention, the same techniques can be used by applying a correction based on the relative position of the monitoring device and the boundary. If the information derived by the monitoring device is used to consider the relative position of the boundary and the solenoid, so that coincidence occurs when the solenoid is vertically above (or below) the boundary, the effect of the present invention can be achieved.

In such an arrangement, the vertical and horizontal fields strengths are measured using a detector having at least one vertical, and at least one horizontal detecting antenna. From those measurements, the ratios of the field strengths is determined, thereby to determine the distance between the detector and the solenoid. Also obtained is the tilt of the solenoid, which should be derived from eg a tilt sensor mounted on the moving underground object. Using those measurements, a prediction of the ratio of the vertical and horizontal field strengths directly above or below the solenoid can be determined, and compared with a corrected measurement value, being the value of that would be measured at the boundary. Then, as the moving underground object moves towards the boundary, the predicted and measured values will eventually coincide.

In such an arrangement, there normally needs to be an established relationship between at least the horizontal antenna of the detector and the solenoid, so that the orientation of the fields of the solenoid and the horizontal coil antenna are the same. This enables the detector to be given the correct orientation relative to the solenoid, since otherwise the comparison of the predicted and measured values of the horizontal and vertical fields may not coincide at the right place, at least when the solenoid is tilted.

The direction of the movement of the underground moving object needs to be determined. There are several ways of doing this. For example, as a boring tool moves from an initial position to a final position, this defines a movement direction. However, it is not always practical to use the start position. Therefore, the monitoring device may measure the field strengths from the solenoid, detect movement of the solenoid, and compare the measured field strengths at successive locations. If the field strength is increasing, the solenoid is moving towards the monitoring devices. Another alternative however, is to make use of the measured ratio of vertical to horizontal field strengths and the predicted value of that ratio directly above the solenoid. The variation of those two values away from the position directly above the solenoid is predictable, and can be used to determine the direction towards the solenoid. This arrangement has the advantage that it does not involve comparison between measured values of the field strengths.

A further complication is that, for some tilt angles of solenoid, there may be a position which is not directly above the solenoid, but for which the measured and predicted values of the ratio of field strengths nevertheless coincide. If that position exists at all, it is relatively remote from the solenoid. Therefore, it is preferable that a detection region is defined proximate the point directly above the solenoid, and an arrangement is provided for detecting when the detector is within that detection region, or for permitting operation of the detector only within the detection region. Then, provided the boundary is only within that detection region, there is only one point at which the measured and predicted values of the ratio coincide.

BRIEF DESCRIPTION OF THE DRAWINGS

Embodiments of the present invention will now be described, by way of example, with reference to the accompanying drawings, in which:

FIGS. 5a and 5b show boundaries defined by monitoring devices in accordance with the present invention.

FIGS. 1a and 1b show an underground solenoid 10.

DETAILED DESCRIPTION

Figure 1A:
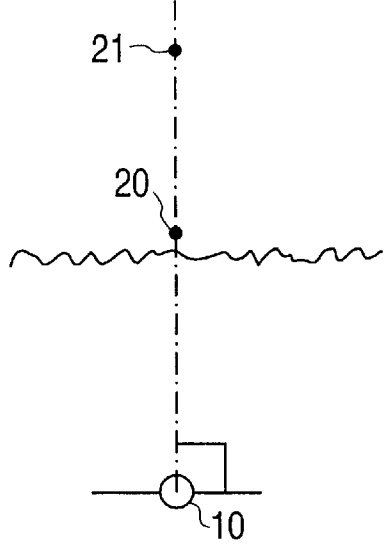
FIG. 1a shows an underground solenoid, viewed along the axis of the solenoid, and first and second measuring points.

An alternating electric current whose magnitude is known is passed through the coils of the solenoid 10. The flow of electric current through the solenoid 10 generates a magnetic field. The magnetic field strength at the solenoid 10 itself can be measured before the solenoid 10 is buried. The solenoid 10 is arranged so that its axis 11 is horizontal. Also shown is a first measuring point 20 and a second measuring point 21 at which magnetic field measurements are made. These measuring points 20,21 lie in the vertical plane containing the axis 11 of the solenoid 10. The measuring points 20,21 lie directly one above the other at a known vertical separation. The location of the first measuring point 20 relative to the solenoid 10 can be defined by a distance $r_1$ between them and the angle $\theta_1$ below the horizontal of the solenoid 10 from the first measuring point 20. The relative positions of the second measuring point 21 and the solenoid are similarly defined by distance $r_2$ and angle $\theta_2$.

The horizontal component $f_h$ and the vertical component $f_v$ of the field strength are measured at the first measuring point 20, and the ratio $f_h/f_v$ is calculated by a system computer (not shown). The ratio $f_h/f_v$ is a function of angle $\theta_1$, and this function can be determined analytically and stored in the memory of the system computer. The function is shown graphically in FIG. 2. It can be seen from FIG. 2 that the function is monotonic, that is, each value of the ratio $f_h/f_v$ corresponds to one and only one value of angle $\theta_1$. Therefore when the calculated value of the ratio $f_h/f_v$ is input to the computer, the value of $\theta_1$ can be derived.

Similar measurements taken at the second measurement point 21 enable angle $\theta_2$ to be derived in the same way. Once these angles have been determined, the distance between the solenoid 10 and the measuring points 20,21 could be derived by triangulation. Instead the absolute values of the field strength at the measuring points 20,21 are measured, and since the field strength at the solenoid itself is known this gives the attenuation of the field at the measuring points 20,21. From the attenuation of the field, the distances $r_1, r_2$ between the solenoid and the measuring points 20,21 can be calculated by the system computer. The attenuation varies both with the distances between the measuring points and the solenoid, and also the angles $\theta_1$ and $\theta_2$. However the angles $\theta_1$ and $\theta_2$ are known, and therefore the attenuation can be determined using e.g. a look-up table which relates attenuation and angle. Once the distances $r_1, r_2$ and angles $\theta_1, \theta_2$ have been determined, the position of the solenoid relative to the measuring points 20,21 is now known. By averaging the results from the two measuring points 20,21 reliability can be increased and the effects of noise can be decreased.

In the above analysis the solenoid was horizontal and therefore the horizontal and vertical components $f_h/f_v$ correspond to the axial and radial components of the magnetic field respectively. It is these components which must be determined in the present invention. If the solenoid were not horizontal, then either the axial and radial components could be measured directly, or the vertical and horizontal components measured and then a correction made to determine the axial and radial components.

Figure 1B:
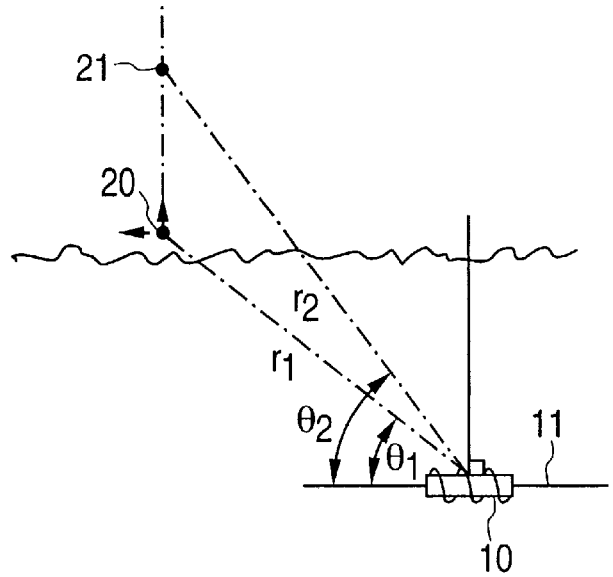
FIG. 1b is a side view of the same solenoid and measuring points.
Figure 2:
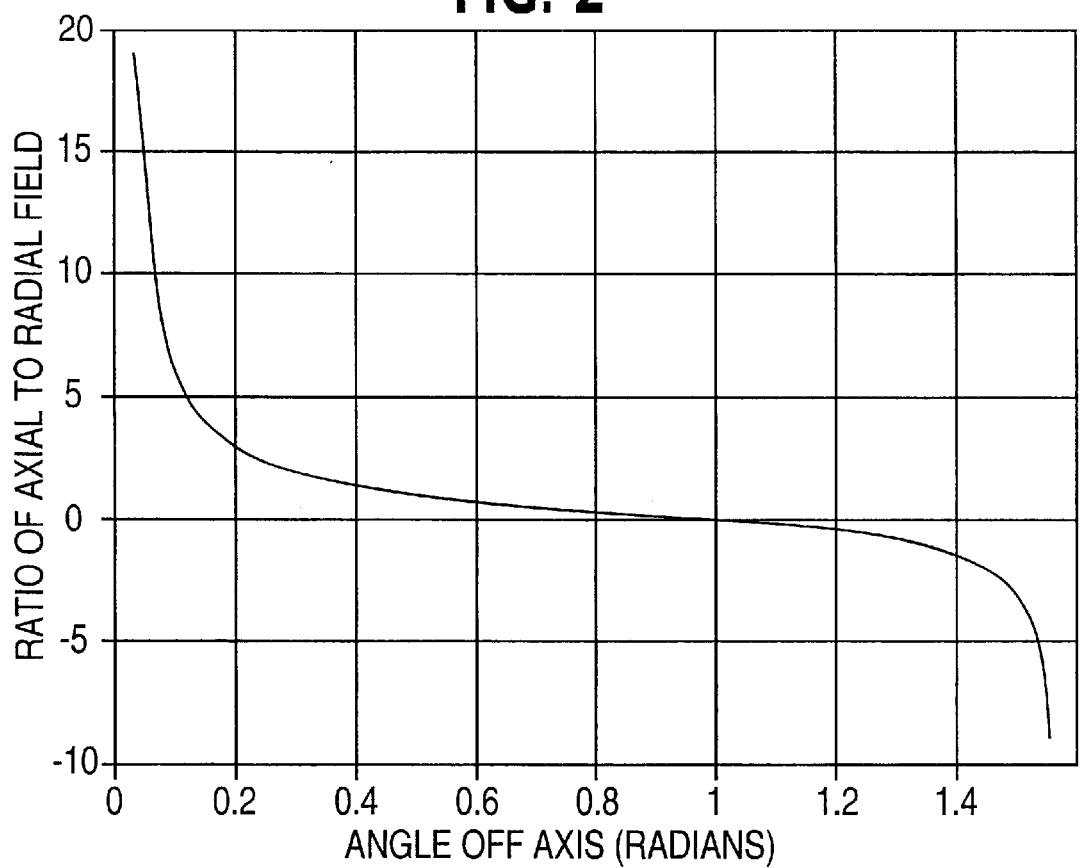
FIG. 2 is a graph showing the ratio of the axial component of the magnetic field at a measuring point to the radial component as a function of the angle between the axis of the solenoid and a line from the measuring point to the centre of the solenoid.

FIG. 2, and the description of FIGS. 1a and 1b assume that the measuring points 20, 21 are in the same plane as the axis of the solenoid. FIG. 2 is therefore concerned with deviation of that axis in the plane. However, if the solenoid 10 is displaced out of the plane, a similar graph is obtained if the values of the ratio of the vertical field to the horizontal field perpendicular to the axis of the solenoid is plotted against lateral displacement (ie the displacement from the solenoid axis. The zero point of such a graph, where the ratio is changes sign, is then when the solenoid 10 is directly below the measurement points 20, 21, ie there is no lateral displacement.

Figure 3:
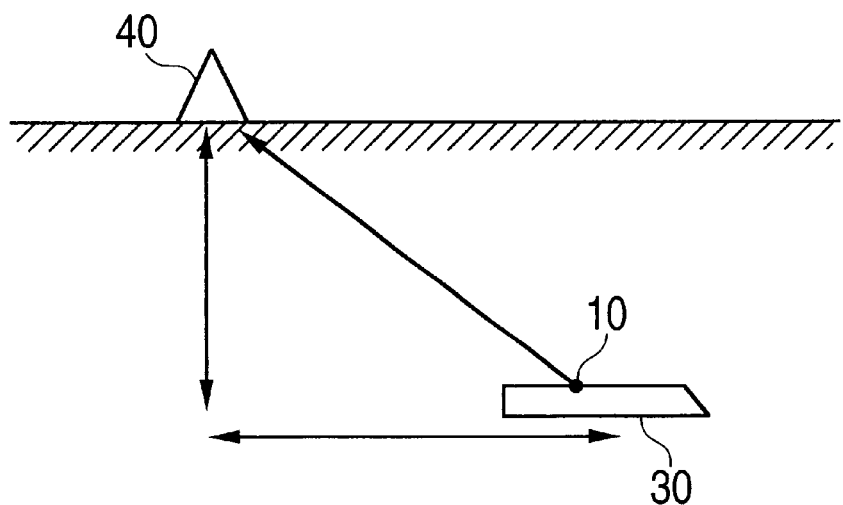
FIG. 3 shows the present invention applied to the location of a sub-surface boring tool.

FIG. 3 shows the application of this principle to locating an underground boring tool 30. The solenoid 10 is mounted on the boring tool 30 such that the axis of the solenoid 10 is parallel to the normal motion of the boring tool 30. In this way, as the boring tool 30 burrows through the earth, the solenoid 10 moves with the boring tool 30 and continuous measurements of the type described above track the motion of the boring tool 30. Receivers (40) are positioned at the two measuring points 20,21. On the basis of the measurements of its position, the boring tool 30 is controlled using conventional control methods.

Figure 4:
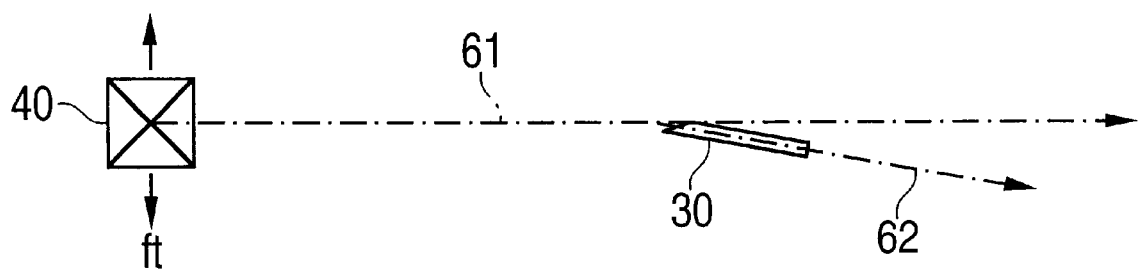
FIG. 4 shows deviation of the boring tool in the horizontal plane.

FIG. 4 is a plan view of the path of an underground boring tool. Initially the drill follows first path 61. However, the non-uniformity of the earth through which the boring tool is tunnelling may cause the drill to deviate in the horizontal plane. FIG. 4 shows the case in which the boring tool is deviated to the right of its initial path so that it then follows second path 62. When this deviation occurs, the vertical plane containing the axis of the solenoid 10 is rotated in the horizontal plane. This means that the receiver 40, and hence the measuring points 20,21, are no longer in this vertical plane. The curve of FIG. 2 is no longer applicable and so the processing of the measured data results in inaccurate drill location. To counter this problem the field component $f_t$ perpendicular to both the vertical plane and the desired path of travel of the drill is measured at measuring point 20. The amplitude of this field component is zero if there is no such deviation, and rises as the deviation increases. The phase of this field component relative to the excitation frequency is a function of whether the deviation is to the left or right. Therefore, from the measured amplitude and phase of this field component, the deviation may be measured and the path of the drill head corrected accordingly.

The above description is derived from WO96/29615, and explains how the position of a solenoid relative to a detector can be derived. In the present invention, the detector containing the antennas 20, 21 is part of a monitoring device which defines a prohibited zone for the boring tool 30. That prohibited zone is the volume of space around the monitoring device. The space is virtual, in that there are no physical effects at the boundaries of that space. However, the monitoring device knows the boundaries of that space relative to its own location. The monitoring device is therefore positioned so that an underground object which the boring tool 30 is to avoid is within that space. The underground object to be avoided may be a pipe or cable, some other underground object such as a buried tank, or even merely a property boundary. Since, as described above, it is possible to determine the relative position of the antennas 20, 21 and the solenoid 10 within the underground boring tool 30, it is therefore possible to determine when the boring tool 30 reaches the boundary. The drive to the boring tool can then be controlled either to halt movement of the boring tool 30, or to change its path away from the boundary.

This effect is illustrated in FIG. 5a. FIG. 5a shows a monitoring device 100 which defines a zone 101 into which the boring tool 30 should not penetrate. That zone 101 has boundaries illustrated by dotted lines 102 in FIG. 5a. The relationship between the boundaries of the zone 101 and the position of the monitoring device 100 need not be fixed. The boundaries may be adjustable by the user to enable the boundaries of the zone 101 to be selected, rather than predetermined.

The monitoring device 100 determines the position of the boring tool 30 relative to the zone 101. If the boring tool 30 reaches a boundary of that zone 101, as illustrated at position A, there is then a risk. A warning may be generated by the monitoring device 100, and/or a signal may be generated by the monitoring device which is transmitted to the drive to the boring tool 30, to halt or divert it. When the boring tool 30 is in position B, where its movement cannot coincide with the zone 101, the monitoring device 100 can determine that there is no risk.

In a development of this, where it is possible for the monitoring device 100 to determine the orientation of the boring tool relative to the boundaries of the zone 101, eg because successive positions of the boring tool 30 are compared, it may be possible to determine that the boring tool 30 is moving towards the zone 101, as illustrated at position C. In this case, it is again possible to generate an alarm. Moreover, at extremes of range, the determination of the position of the boring tool 30 relative to the zone 101 is less accurate. Therefore, at the part of the zone 101 furthest from the monitoring device 100, additional zones 103 may be defined, alarms and/or changes of movement of the boring tool 30 when the boring tool 30 enters those zones 103. An increased level of safety is thus provided in areas where the measurement is less accurate.

As illustrated in FIG. 5a, the monitoring device 100 may be positioned over a cable 104, so that the zone 101 prevents the boring tool 30 approaching that cable 104 too closely. It can be seen, however, that it is not essential for the monitoring device 100 to be positioned exactly over the cable 104. Provided the cable 104 is sufficiently within the zone 101, then the boring tool 30 cannot reach the cable 140 without first intercepting the boundaries of the zone 101. As a result, accurate positioning of the monitoring device 100 is not needed for the present invention to protect an underground object.

In the arrangement described above, the monitoring device is approximately central within the zone 101. It must therefore compare the signal strengths measured with suitable predetermined values. However, if only a single boundary is needed, eg because the aim is for the boring tool 30 to operate only on one side of that boundary, it may be easier for the monitoring device to be located along the boundary. In such circumstances, the arrangement may make use of the fact that the ratio of axial to radial fields changes sign from one side of the monitoring device 100 to the other, as has previously been described. Thus, if the monitoring device 100 is positioned on the boundary as shown in FIG. 5b, the ratio will have one sign when the boring tool 30 is on one side of the boundary, and a different sign when it is on the other. Thus, if the solenoid is operated so that changes of sign do not occur, because the ratio never reaches zero, then the boring tool 30 must always be on one side of the boundary.

The above discussion with reference to FIGS. 5a and 5b, considers the situation in which the boring tool 30 is operating in a direction generally aligned with the cable 104. In that case, the depth of the boring tool 30 need not be considered, and the zone 101 may be considered to have no vertical limits, and instead extends downwardly from the surface. Thus, in such circumstances, if the boring tool 30 moves within the zone 101 at any depth, an alarm and/or change of movement of the boring tool 30 may be triggered.

Figure 6:
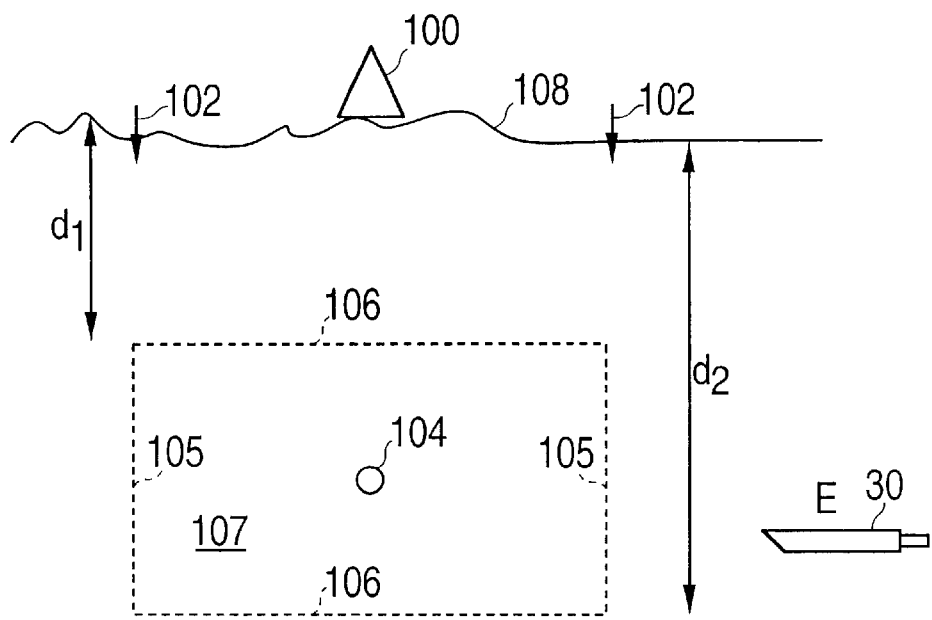
FIG. 6 shows vertical boundaries defined by a monitoring device in accordance with the present invention.

However, there are situations in which the boring tool must move above or below the cable, and thus depth considerations must be taken into account. This situation is considered in the arrangement shown in FIG. 6. In this arrangement, the lateral boundaries 102 of the zone into which the boring tool 30 should not penetrate are extended downwardly to form boundaries 105, and upper and lower boundaries 106 at depths $d_1$ and $d_2$ generally parallel to the ground surface 107 are then defined by the monitoring device 100. This has the effect of defining a volume 107 which corresponds to the zone 101, but in three dimensions below the surface 107. It would, of course, be possible for the upper boundary 106 to coincide with the surface 107 (ie. depth $d_1$ to be zero) if it were unsafe for the boring tool 30 to pass between the upper surface of the volume 107 and the ground surface 108.

Figure 7:
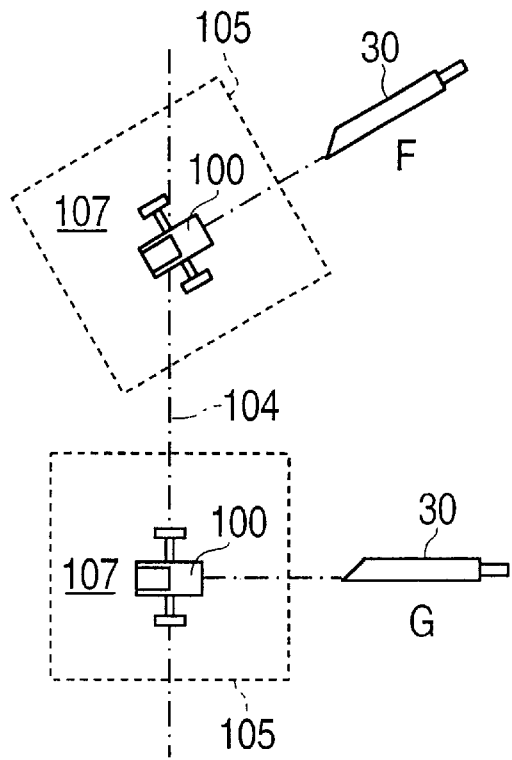
FIG. 7 shows alignment of boundaries with the underground boring tool.

For the same way as the zone 101, the volume 107 is defined relative to the monitoring device 100, rather than the cable 104. It is assumed that the volume 107 contains the relevant part of the cable 104 which is to be protected. However, and with reference to FIGS. 1a and 1b, it is important for accuracy that the receiver coils are then aligned with the direction of the solenoid of the boring tool 30. Therefore, as shown in FIG. 7, it is important to align the monitoring device 100 with the direction of approach of the boring tool 30. If the boring tool 30 is moving perpendicularly to the cable 104, as shown at G in FIG. 7, then the depth of the boring tool 30, and its spacing relative to the zone 107, can be determined. It must be less that depth $d_1$ or greater than depth $d_2$, for the boring tool to be considered to be safe, irrespective of its position relative to the boundaries 105. If, however, its depth is between depths $d_1$ and $d_2$ then its position relative to the boundary 105 must be considered. To enable this to be done accurately, it may be necessary to rotate the measuring device 100 to be aligned with the boring tool 30, when the movement of the boring tool 30 is inclined to the direction of the cable 104, as shown at F in FIG. 7.

The above discussion assumed that the boring tool 30 was moving generally parallel to the ground surface 108, so that if its depth was less than d1, or greater than d2, it would never impinge on the zone 107. Of course, the boring tool 30 may be tilted, and then the boring tool 30 may need to have a tilt sensor therein, as described in GB 2330204, to determine this.

However, the techniques described in GB 2330204 can also be used provide an estimate of depth, and so assist to determine whether the boring tool is between depth D1 and D2 as discussed above.

As discussed in GB 2330204, horizontal and vertical field strengths may be measured using suitable antennas and the ratio of the measurements determined. As will be described in more detail subsequently, by using information corresponding to the tilt of the solenoid 10, of the boring tool 30 and the distance between the monitoring device 100 and the solenoid 10, it is possible to predict what the ratio of the vertical to horizontal field would be if the monitoring device 100 were positioned vertically above the solenoid 10. Measured and predicted values can therefore be compared. When they coincide, the monitoring device 100 is vertically above the solenoid 10. The determination of the predicted value of the ratio can take into account the shifting of the vertical and horizontal fields when the solenoid 10 is tilted from the horizontal, and so can produced an estimate which coincides with the measured value when the monitoring device 100 is, in fact, directly above the solenoid 10.

The determination of the actual and predicted ratios of vertical to horizontal fields will now be discussed. Note that the "predicted" or "target" ratio is the predicted ratio directly above the solenoid 10, whilst the actual ratio is that measured at the current location of the monitoring device 100. If the boring tool 30 were to move to a position directly below the monitoring device 100, then these two values of the ratio should coincide. The first step is to measure, at the monitoring device 100, the field strengths on the horizontal and vertical axes. These are given by the following two equations:

$$SAmp(r, \theta) := \frac{1}{r^3} \cdot \left( \frac{3 - \cos(2 \cdot \theta)}{4} \right)$$

$$SVec(\theta) := \left( \cos(2 \cdot \theta) + \frac{\cos(4 \cdot \theta)}{2.2}, \sin(2 \cdot \theta) + \frac{\sin(4 \cdot \theta)}{2.2} \right)$$

Then it is necessary to define the properties of the detector 10.

| | |
|---|---|
| tip: = 0.05 | Tip to B_V distance |
| B_Voff: −0.069 | Ground to B_V |
| T_0off: = 0.753 | Ground to T_0 |
| B_Vpos$_n$: = (pos$_n$ depth$_n$ + B_Voff) | B_0 position |
| T_0pos$_n$: = (pos$_n$ depth$_n$ + T_0off) | T_0 position |
| B_Vvec$_n$: = (0 1) | B_V vector |
| T_0vec$_n$: = (1 0) | T_0 vector |

In the above equations, n is the current measurement point and in the subsequent discussions it is assumed that there is N such measurement points. This number is, of course, arbitrary since each measurement point corresponds to a particular position of the monitoring device 100 relative to the solenoid 10.

Then, it is necessary to define a correction matrix which corrects the measurements for tilt.

$$T_n := \begin{pmatrix} \cos(-tilt_n) & \sin(-tilt_n) \\ -\sin(-tilt_n) & \cos(-tilt_n) \end{pmatrix}$$

Thus:

$$B\_Vp_n := B\_Vpos_n \cdot T_n$$

$$B\_Vv_n := B\_Vvec_n \cdot T_n$$

Thus:

$$B\_Vr_n := \sqrt{[(B\_Vp_n^T)_0]^2 + [(B\_Vp_n^T)_1]^2}$$

Also:

$$T\_0p_n := T\_0pos_n \cdot T_n$$

$$T\_0v_n := T\_0vec_n \cdot T_n$$

$$T\_0r_n := \sqrt{[(T\_0p_n^T)_0]^2 + [(T\_0p_n^T)_1]^2}$$

$$B\_Vang_n := mod\left[ 5 \cdot \frac{\pi}{2} + Atan\lfloor (B\_Vp_n^T)_1, (B\_Vp_n^T)_0 \rfloor, 2 \cdot \pi \right]$$

This gives B_V for the angle of tilt of the solenoid 12.

$$T\_0ang_n := mod\left[ 5 \cdot \frac{\pi}{2} + Atan\lfloor (T\_0p_n^T)_1, (T\_0p_n^T)_0 \rfloor, 2 \cdot \pi \right]$$

This gives T_0 for the angle of tilt of the solenoid 12. Then the detected signals are analysed $$B\_V_n := SAmp(B\_Vr_n, B\_Vang_n) \cdot \Sigma(B\_Vv_n \cdot SVec(B\_Vang_n)^T)$$

$$T\_0_n := SAmp(T\_0r_n, T\_0ang_n) \cdot \Sigma(T\_0v_n \cdot SVec(T\_0ang_n)^T)$$

From, the above calculations, the field strength magnitude at point n can be calculated from the following equation:

$$mag_n := \sqrt{(B\_V_n)^2 + (T\_0_n)^2}$$

Furthermore, the ratio of the measured horizontal to vertical field strength is then given by:

$$Act\_ratio_n := \frac{B\_V_n}{(T\_0)_n}$$

The relationship between magnitude, and target ratio (for the point directly above the solenoid 10) are recorded for various tilt angles in appropriate tables. The size of these tables may depend on the available memory space but, as will be described subsequently it is possible to interpolate within the values in the tables. Moreover, although the tables should, in theory, contain values of all possible tilts, and all possible distances, this is found not to be necessary in practice. At least for a boring tool 30, tilt angles of ±45° represent the normal permitted range, and depths up to 30 m represent the normal range of depths. From those constraints, suitable tables can be obtained.

In the subsequent discussions, these tables are defined as follows:

| | |
|---|---|
| mag_table: = READPRN (magtab) | Magnitude Table for depth |
| rat_table: = READPRN (rattab) | Target ratio table |
| A: = cols (rat_table) | The number of tilt values |
| M: = rows (rat_table) | The number of depth values |

This terminology is derived from the Mathcad program produced by Microsoft Inc. the tables are a matrix of solutions to the mathematical model previously described. In particular, Mag table is used to determine an estimate for depth from inputs of horizontal and vertical antennas and the tile angle of the solenoid. Rat table iG7s used to determine the target ratio when directly above (or below) the solenoid using an estimated depth derived from the mag table and the tile.

Then it is necessary to determine the brackets for tilt $$tilt\_high_n := \sum_a if$$

$$(a = 0, 0, if\ (mag\_table_{0,a-1} < an_n,\ if\ (mag\_table_{0,a} \geq an_n, a, 0), 0))$$

$$tilt\_low_n := tilt\_high_n - 1$$

Then calculate the interpolation ratio for tilt $$high\_mix_n := \frac{an_n - mag\_table_{0,tilt\_low_n}}{mag\_table_{0,tilt\_high_n} - mag\_table_{0,tilt\_low_n}}$$

Next generate the depth and ratio tables:

$$depth\_table_{n,m} := mag\_table_{m,tilt\_high_n} \cdot high\_mix_n + mag\_table_{m,tilt\_low_n} \cdot (1 - high\_mix_n)$$

$$radio\_table_{n,m} := rat\_table_{m,tilt\_high_n} \cdot high\_mix_n + rat\_table_{m,tilt\_low_n} \cdot (1 - high\_mix_n)$$

Then find the brackets for depth $$depth\_high_n := \sum_a if(m < 2, 0,$$

$$if(depth\_table_{n,m-1} > mag_n, if(depth\_table_{n,m} \leq mag_n, m-1, 0), 0))$$

$$depth\_low_n := depth\_high_n + 1$$

Then the interpolation ratio for tilt is calculated $$depth\_mix_n := \frac{mag_n - depth\_table_{0,depth\_low_n}}{depth\_table_{0,depth\_high_n} - depth\_table_{0,depth\_low_n}}$$

Next the perceived depth is calculated $$Est\_depth_n := depth\_mix_n \cdot mag\_table_{depth\_high_n,0} + (1 - depth\_mix_n) \cdot mag\_table_{depth\_low_n,0}$$

Finally the target ratio is calculated $$Targ\_ratio_n := depth\_mix_n \cdot ratio\_table_{n,depth\_high_n} + (1 - depth\_mix_n) \cdot ratio\_table_{n,depth\_low_n}$$

The target ratio is then the predicted value of the ratio of vertical to horizontal field strengths for position n and thus may be compared directly with the actual ratio determined as previously described.

Figure 8:
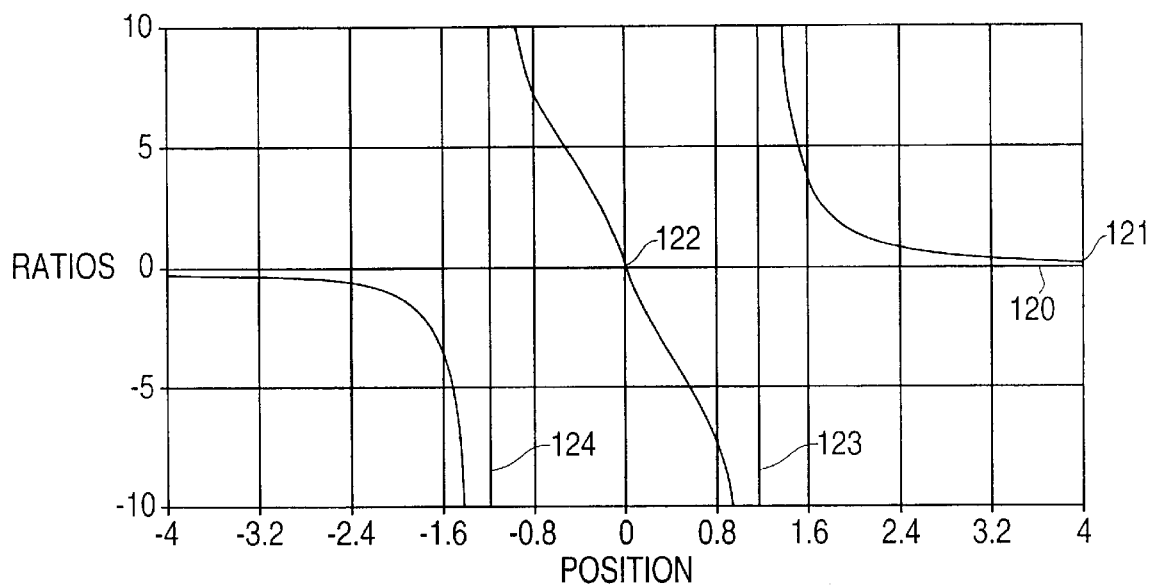
FIG. 8 is a graph showing the variation of the ratio of the vertical to horizontal fields with distance from the point vertically above the underground boring tool.
Figure 9:
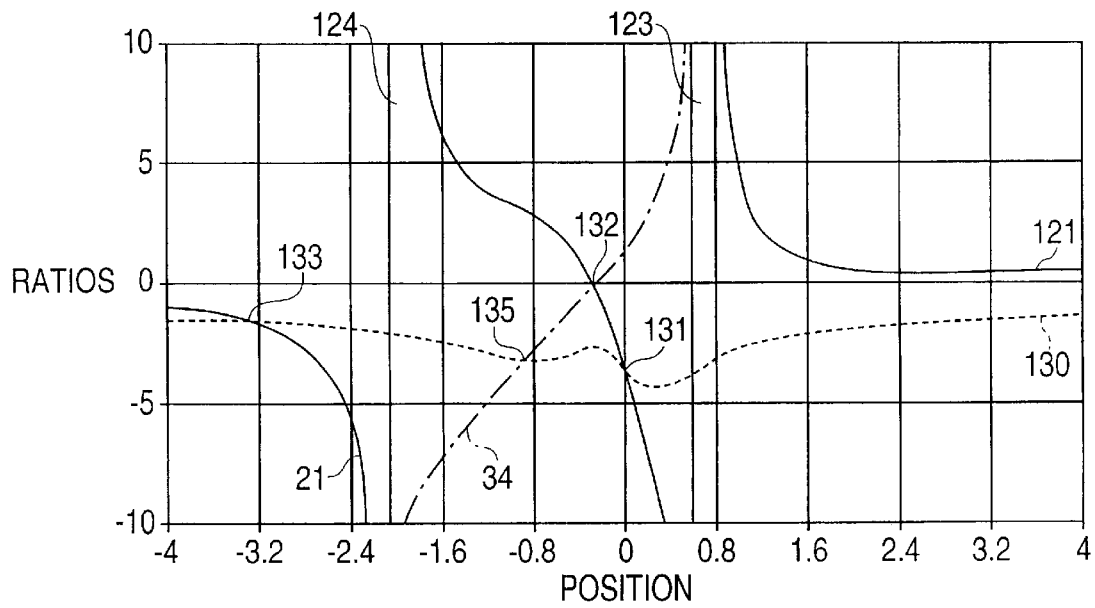
FIG. 9 is a graph similar to FIG. 7, but with the underground boring tool tilted.

FIGS. 8 and 9 illustrate the relationship between the measured ratio of the vertical and horizontal field and the predicted values of that ratio vertically above the solenoid 10. In FIG. 8, the solenoid 10 is horizontal, and therefore it is possible to say that the predicted ratio should always be zero, as indicated by dotted line 120 since the vertical field is zero directly above the solenoid 10. The measured value, indicated by solid line 121, then varies. As can be seen from FIGS. 9 and 10, the measured values tends to infinity at two points, 123 and 124, where there are no real solutions of the measured value. As can be seen, points 123, 124 where the measured value tends infinity (those points will hereafter be referred to as "infinities" for the sake of convenience) occur at positions spaced from the position directly above the solenoid 10, and correspond to the zero points of the horizontal field, with the measured value of the ratio corresponding to solid line 121 crossing the predicted value corresponding to dotted line 120 only at position 122 which is vertically above the solenoid 10.

Figure 10:
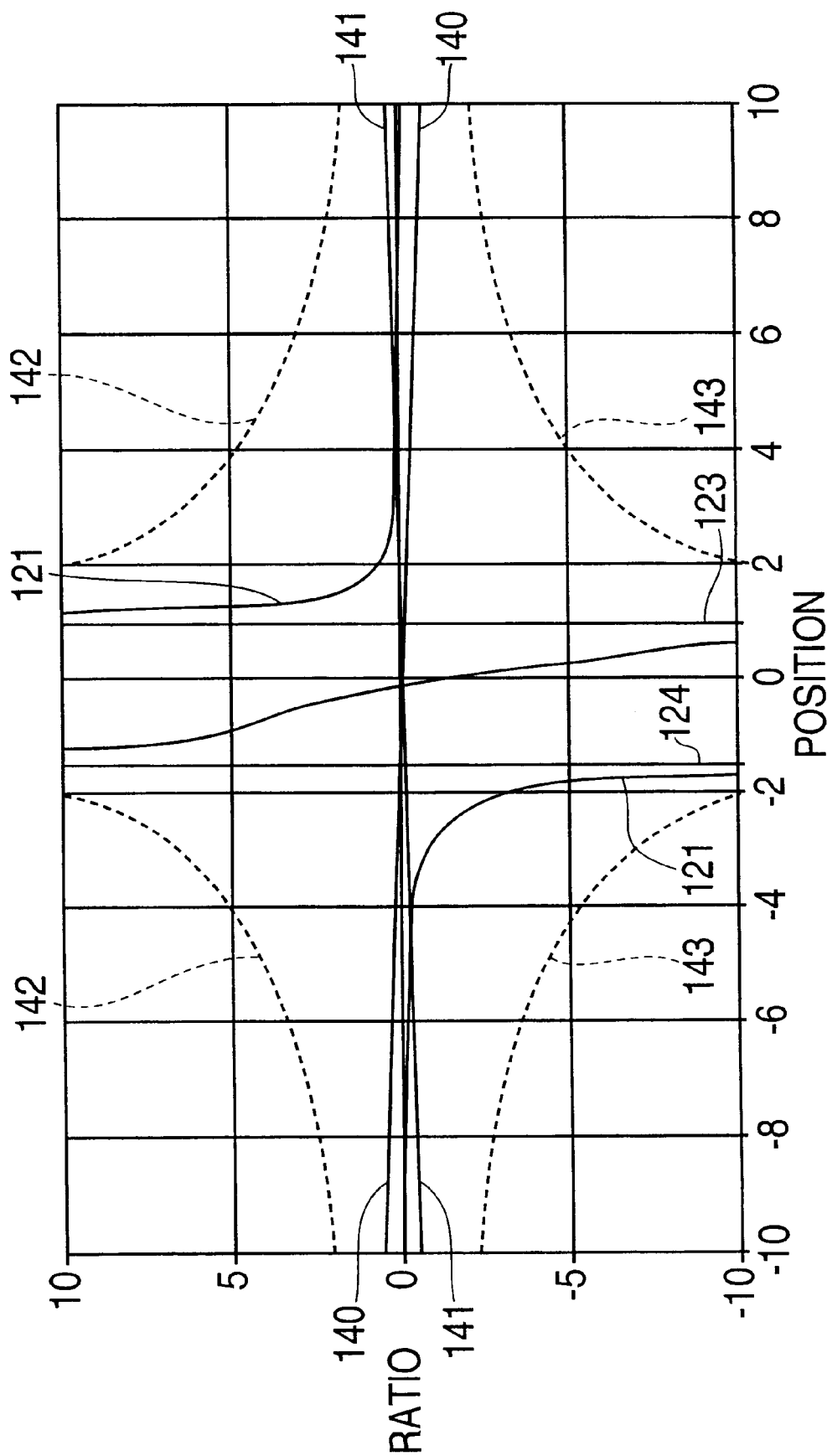
FIG. 10 is a graph similar to FIG. 7, but with reference values marked thereon.

The position is much more complex when the solenoid 10 is tilted. This is illustrated in FIG. 10. Since the predicted value of the ratio is derived from measurements of the actual values of the vertical and horizontal fields, the predicted value itself varies with the current position of the measuring device 100 relative to the solenoid 10. This is illustrated by dotted line 130. As can be seen, the dotted line 130 does not follow the line where the ratio is zero, unlike in FIG. 8. Nevertheless, the predicted value of the ratio represented by dotted line 130 still crosses the solid line corresponding to the measured value of the ratio at a point 131 which is vertically above the solenoid 10. However, at that point 131, the ratio is not zero. The ratio is zero at the position, which corresponds to the position 132 in FIG. 4, but this point is not directly above the solenoid 10, but is displaced As has previously been mentioned, the shape of the dotted line 130, representing the predicted values of the ratio, will vary with tilt of the solenoid 10. As the tilt of the solenoid increases, the line 130 moves away from the zero value of the ratio represented by dotted line 120 in FIG. 8.

Thus, at least for measurements between the infinities 123, 124 of the ratio shown in FIGS. 8 and 9, movement of the solonoid 10 towards the monitoring device 10 will cause the measured and predicted values to approach each other, and they will coincide when the monitoring device 10 is directly above the solenoid 10. There is no need for previous values of the ratio to be stored, since a predicted value can be derived from each measurement.

However, FIG. 9 illustrates a problem for some values of tilt of the solenoid 10, namely that there may be a point 133 remote from the position vertically above the solenoid 10 at which the predicted value of the ratio represented by line 130 coincides with the measured value represented by the solid line 121. If initial measurements were made close to that point 133, the determination of the position of the solenoid 10 may be erroneous.

Therefore, it is necessary to eliminate such faulty coincidences, which can only occur outside the region defined by the infinities 123, 124. Therefore, it is preferable to have a way of determining that measurements are within those infinities 123, 124. There are several ways of doing this. One simple way is to detect the position of the infinities 123, 124 themselves, and only start to compare the measured and predicted values of the ratios only when an infinity has been crossed by the detector. Of course, once the infinity has been crossed, the movement of the solenoid 10 must be towards the monitoring device 100, to prevent erroneous results due to detection of an infinity 123, 124 and then movement away from the solenoid 10, which could result in the system arriving at position 133 in FIG. 9.

Another way is to make use of values derived from estimates of the depth of the solenoid 10. This method uses four values namely:

$$Value1 \quad pit_n := \frac{Est\_depth_n}{20}$$

These four values are chosen because they create $$Value2 \quad pitn_n := \frac{Est\_depth_n}{20}$$

$$Value3 \quad pit\_extn_n := \frac{20}{Est\_depth_n}$$

$$Value4 \quad pit\_ext_n := \frac{20}{Est\_depth_n}$$

reliable mode changeover control functions, so that the detector can detect when it passes through the infinities 123, 124. Of course, in practical situations, measurement accuracy, interference and noise must all be taken into account.

The four values are functions of estimated depth, and thus can be added to the graph of FIG. 8, as shown in FIG. 10. In FIG. 10, value 1 is shown by line 140, value 2 by solid line 141, value 3 by dotted line 142, and value 4 by chain line 143.

Then, if the monitoring device 100 is on the positive side of the solenoid 10 when detection starts, then the monitoring device 100 is triggered when the measured value of the ratio of the vertical to horizontal fields is between values 1 and 3 (curves 140 and 142). As can be seen, this is necessary on the negative side of infinity 123. Similarly, if the monitoring device 100 starts on the negative side of the solenoid 10, then the monitoring device 100 is triggered when the measured value of the ratio is between values 2 and 4. Again, as can be seen from FIG. 10, this is necessarily less negative than infinity 124.

This arrangement, and indeed the relationships illustrated by FIGS. 8 and 9, depend on a convention for expressing the direction of a horizontal coil of the monitoring device relative to the solenoid 10. The fields have different phases at different distances from the solenoid 10. The calculation of the estimated value of the ratio has to assume relative orientation of the horizontal antenna and the solenoid 10, and it is preferable to say that the two are aligned when they have the same direction of spiral. This enables the monitoring device 100 to be oriented correctly as the solenoid 10 moves. If it were oriented with the horizontal antenna in the opposite direction, the measured value of the ratio would correspond approximately to the chain line 134 in FIG. 9, which crosses the line 130 representing the predicted ratio at a point 135 which is not directly above the solenoid 10. Of course, it would be possible to alter the calculation of the predicted value of the ratio on the assumption that the horizontal antenna and the solenoid 10 were in anti-alignment, and this would move the position of dotted line 130 in FIG. 9 to a position in which it coincided with the chain line 134 when the monitoring device 100 directly above the solenoid 10. The choice of alignment or anti-alignment is thus possible, but only when the calculation of the predicted value is adjusted accordingly.

The calculation of the predicted value of the ratio also depends on a measurement of the distance from the monitoring device 100 to the solenoid 10. There are many ways of obtaining an appropriate distance value. If the magnetic field strength of the solenoid 10 is known, then the decrease of field strength with distance from the solenoid is also predictable, and therefore measuring the field strength at any point gives a measure of the distance from the monitoring device 100 to the solenoid 10. If the field strength of the solenoid 10 is not known, two field strengths may be made a known distance apart, and the field strength at the solenoid can then be determined.

Figure 11:
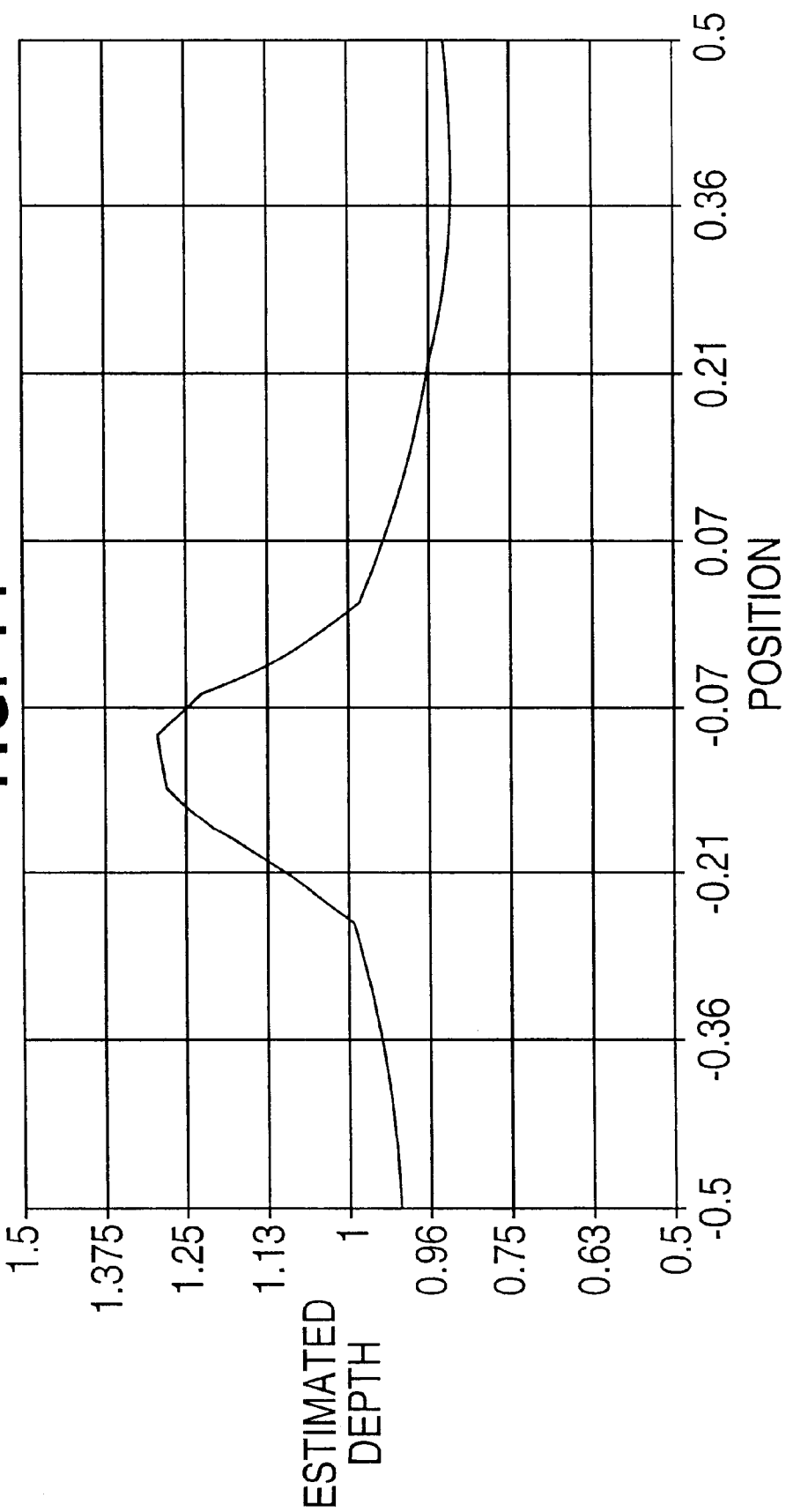
FIG. 11 is a graph showing the variation of estimated depth with position.

At positions very close to the position vertically above the solenoid (e.g. within less than 0.2 m), the estimated value of the depth varies significantly with the position, and this causes a significant change in the value of the predicted ratio. This is illustrated in FIG. 11. FIG. 11 illustrates the case where the depth is 1.0 m. As shown in FIG. 11, at positions close to the position directly above the solenoid 10, variation in estimated depth with position is very large. For the 1.0 m depth, in a region of ±0.02 m, the estimate of depth is variable ±25% to −28%. Thus, any small change in position significantly affects the other factors which depend on that estimated depth.

However, for most practical concealed objects, such as boring tools, a determination of position to ±0.2 m is sufficiently accurate for practical purposes. Therefore, it may be better to indicate to the operator when a region of ±0.2 m "over" the solenoid 12 is reached, and then to re-calculate the depth as if the detector 10 was, in fact, directly above the solenoid, so that an accurate depth reading can be obtained.

The above description was derived from GB 2330204 but it can be appreciated that it involves making an estimate of depth, which can be tested against subsequent estimate derived from different positions of the solenoid of the boring tool 30. Thus, whereas GB 9721377.1 had proposed that the detector be moved until it was positioned directly above the solenoid, in order to get an accurate position of depth, an estimate of depth can be obtained when the solonoid is remote from the monitoring device 100. Moreover, by taking into account estimates derived from multiple positions of the solenoid of the boring tool 30, a more reliable estimate of the depth boring tool can be determined. Thus, it is possible to decide the depth of the boring tool 30 on arrival at the boundary 105 and thus decide whether it is between depths D1 and D2, and so present a risk. Since the depth D1 and D2 are chosen so that any object to be protected is not close to either of those depths, but is somewhere between, then small inaccuracies in depth estimation do not affect the present invention.

What is claimed is:

1. A method of detecting the movement of an underground object comprising:

storing, in a monitoring device, data defining a boundary extending in space, the boundary extending at a position relative to said monitoring device;

generating a magnetic field using generating means on or in the object, said generating means comprising a solenoid coil, said solenoid coil defining a dipole axis; and detecting the magnetic field at the monitoring device and determining the position of the object relative to the monitoring device, and hence the boundary, said monitoring device being spaced laterally from a vertical plane containing said dipole axis.

2. A method according to claim 1 further including detecting the direction of movement of the object so as to determine when the object approaches the boundary.

3. A method according to claim 1, wherein the monitoring device has two antennas, for detecting the magnetic field, said magnetic field having an axial component and a radial component at the monitoring device, said axial component and said radial component having a ratio there between, the monitoring device measures the axial and radial component of the field, determines said ratio of those components, and compares said ratio with stored information relating to the ratio of the axial and radial components.

4. A method according to claim 1, wherein said magnetic field has vertical components and horizontal components having further ratios there between, the monitoring device measures the vertical and the horizontal components of the magnetic field, predicts a value for the further ratio of said horizontal and vertical components vertically above the generating means, and compares that prediction with a predicted value of said further ratio at the boundary, thereby to determine when said ratios coincide and thus when the object reaches the boundary.

5. A method according to claim 1, wherein the boundary is a vertical plane.

6. A method according to claim 1, wherein the boundary defines a horizontal plane.

7. A method according to claim 1, wherein the boundary defines a volume of space.

8. A method of controlling the movement of an underground object, comprising:

storing, in a monitoring device, data defining a boundary extending in space, the boundary extending at a position relative to said monitoring device;

generating a magnetic field using generating means on or in the object said generating means comprising a solenoid coil, said solenoid coil defining a dipole axis; and detecting the magnetic field at the monitoring device and determining the position of the object relative to the monitoring device, and hence the boundary, and controlling the movement of the object to prevent the object crossing the boundary, said monitoring device being spaced laterally from a vertical plane containing said dipole axis.

9. A method according to claim 8, wherein the monitoring device has two antennas, for detecting the magnetic field, said magnetic field having an axial component and a radial component at the monitoring device, said axial component and said radial component having a ratio there between the monitoring device measures the axial and radial component of the field, determines said, ratio and compares said ratio with stored information relating to the ratio of the axial and radial components.

10. A method according to claim 8, wherein said magnetic field has vertical components and horizontal components, said vertical components and said horizontal components having further ratios there between, the monitoring device measures the vertical and the horizontal components of the magnetic field, predicts a value for the further ratio of those components vertically above the generating means, and compares that prediction with a predicted value of said further ratio at the boundary, thereby to determine when said values coincide and thus when the object reaches the boundary.

* * * * *